US010718374B2

(12) United States Patent
Panda et al.

(10) Patent No.: US 10,718,374 B2
(45) Date of Patent: Jul. 21, 2020

(54) STABILIZERS AND BEARINGS FOR EXTREME WEAR APPLICATIONS

(71) Applicant: Halliburton Energy Services, Inc., Houston, TX (US)

(72) Inventors: Krutibas Panda, The Woodlands, TX (US); Philip Park-Hung Leung, Edmonton (CA); Tyler Jeffrey Romanyk, Edmonton (CA); Andrew McPherson Downie, Fife (GB); Steven Graham Bell, Red Deer (CA)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/314,360

(22) PCT Filed: Aug. 18, 2017

(86) PCT No.: PCT/US2017/047637
§ 371 (c)(1),
(2) Date: Dec. 28, 2018

(87) PCT Pub. No.: WO2018/044599
PCT Pub. Date: Mar. 8, 2018

(65) Prior Publication Data
US 2019/0154081 A1    May 23, 2019

Related U.S. Application Data

(60) Provisional application No. 62/380,897, filed on Aug. 29, 2016.

(51) Int. Cl.
| | | |
|---|---|---|
| *F16C 17/14* | (2006.01) | |
| *F16C 33/04* | (2006.01) | |
| *F16C 33/10* | (2006.01) | |
| *E21B 4/02* | (2006.01) | |
| *F16C 33/66* | (2006.01) | |
| *F16C 33/12* | (2006.01) | |

(Continued)

(52) U.S. Cl.
CPC .............. *F16C 17/14* (2013.01); *E21B 4/003* (2013.01); *E21B 4/02* (2013.01); *F16C 33/043* (2013.01);
(Continued)

(58) Field of Classification Search
CPC ...... F16C 17/14; F16C 33/043; F16C 33/108; F16C 33/1085; F16C 33/121;
(Continued)

(56) References Cited

U.S. PATENT DOCUMENTS

| 4,560,014 A * | 12/1985 | Geczy | E21B 4/003 |
| | | | 175/107 |
| 4,756,631 A * | 7/1988 | Jones | E21B 10/22 |
| | | | 175/359 |
| 4,802,539 A * | 2/1989 | Hall | E21B 10/20 |
| | | | 175/371 |
| 7,311,159 B2 * | 12/2007 | Lin | F16J 15/3496 |
| | | | 175/371 |

(Continued)

FOREIGN PATENT DOCUMENTS

| CA | 2814141 A1 * | 4/2012 | ............. E21B 4/14 |
| GB | 2543115 A * | 4/2017 | ............. C22C 29/16 |
| WO | WO-2014201458 A1 | 12/2014 | |

OTHER PUBLICATIONS

Korean Intellectual Property, International Search Report and Written Opinion, PCT/US2017/047637, dated Oct. 25, 2017, 13 pages, Korea.

*Primary Examiner* — Marcus Charles (57) ABSTRACT

Downhole tools such as bearing assemblies and stabilizers are described for withstanding abrasive and erosive wear in operation. These stabilizers and bearing assemblies employ
(Continued)

wear-resistant hard materials such as TSP, PCD, leached WC, and SCD composite materials. A bond between a braze material and wear tiles constructed of a hard phase material may include a non-planar interface with the braze material. Self-lubricating materials may be provided within the braze material or the hard material in some instances.

18 Claims, 11 Drawing Sheets

(51) Int. Cl.
  *E21B 4/00*   (2006.01)
  *E21B 7/06*   (2006.01)
  *E21B 17/10*  (2006.01)

(52) U.S. Cl.
  CPC ........ *F16C 33/121* (2013.01); *F16C 33/6696* (2013.01); *E21B 7/062* (2013.01); *E21B 17/1078* (2013.01); *F16C 2206/04* (2013.01); *F16C 2206/06* (2013.01); *F16C 2206/40* (2013.01); *F16C 2206/82* (2013.01); *F16C 2352/00* (2013.01)

(58) Field of Classification Search
  CPC .............. F16C 33/6696; F16C 2206/04; F16C 2206/06; F16C 2206/40; F16C 2206/82; F16C 2352/00; E21B 4/02; E21B 7/062; E21B 17/1078; E21B 4/003

USPC ........... 384/93, 95, 123, 282, 285, 291–292, 384/907.1; 175/107, 359, 337, 371, 428
See application file for complete search history.

(56) References Cited

U.S. PATENT DOCUMENTS

| | | | | |
|---|---|---|---|---|
| 7,559,381 | B2* | 7/2009 | Lin | E21B 10/22 |
| | | | | 175/372 |
| 7,918,274 | B2* | 4/2011 | Thornton | E21B 17/1085 |
| | | | | 166/241.2 |
| 8,770,845 | B1* | 7/2014 | Hunt | F16C 33/043 |
| | | | | 384/283 |
| 8,834,026 | B2* | 9/2014 | Flores | E21B 10/23 |
| | | | | 384/93 |
| 9,200,488 | B2* | 12/2015 | Kirkhope | E21B 4/003 |
| 10,030,704 | B2* | 7/2018 | Hall | F16C 33/043 |
| 2004/0238226 | A1 | 12/2004 | Lin | |
| 2009/0242193 | A1 | 10/2009 | Thornton | |
| 2012/0294557 | A1* | 11/2012 | Soelch | C09D 147/00 |
| | | | | 384/282 |
| 2013/0182982 | A1* | 7/2013 | Dennis | E21B 4/003 |
| | | | | 384/456 |
| 2013/0266247 | A1* | 10/2013 | Watson | F04D 13/10 |
| | | | | 384/276 |
| 2015/0023815 | A1 | 1/2015 | Tetzlaff et al. | |
| 2015/0093058 | A1 | 4/2015 | Hunt et al. | |
| 2016/0016244 | A1 | 1/2016 | Dennis et al. | |

* cited by examiner

STABILIZERS AND BEARINGS FOR EXTREME WEAR APPLICATIONS

CROSS-REFERENCE TO RELATED APPLICATION(S)

This application is a U.S. national stage patent application of International Patent Application No. PCT/US2017/047637, filed Aug. 18, 2017, which claims priority to U.S. Provisional Application No. 62/380,897 filed Aug. 29, 2016, entitled "Stabilizers and Bearings for Extreme Wear Applications," the benefit of each of which, and the disclosure of each of which is hereby incorporated by reference in its entirety.

BACKGROUND

The present disclosure relates generally to equipment useful in operations related to subterranean wellbores, e.g., wellbores employed for oil and gas exploration, drilling and production. More particularly, embodiments of the disclosure relate to components of a drilling assembly that withstand erosive and corrosive wear.

Downhole dulling tools include turbines or Turbodrills, which are high-speed rotating machines used to drive drill bits in hard rock drilling applications. Turbodrills are typically about 10-12 meters in length, with long drive-shafts that transmit the power generated from the drilling fluid passing through the turbine blades to the drill bit. To ensure proper guidance and dynamic control of the rotating shafts mud lubricated radial guide bearings are staged at intervals along the shaft length. Mud lubrication of these bearings is preferred as the mud passing through the tool also cools and flushes the bearing surfaces. Drilling muds generally contain solids materials, which can in themselves be abrasive, but may also contain fine debris recirculated from the drill bit. Consequently, mud lubricated bearings are subject to wear and tear due in part to the presence of abradants in the mud.

Stabilizers are often provided to centralize the turbodrill in the wellbore. The stabilizers protrude from an outer surface of the turbodrill and abrasively engage the wall of the wellbore to help keep the drill bit oriented in a desired direction. As mud is recirculated from the drill bit, the stabilizers are also exposed to mudflow and the associated wear.

BRIEF DESCRIPTION OF THE DRAWINGS

The disclosure is described in detail hereinafter, by way of example only, on the basis of examples represented in the accompanying figures, in which.

DETAILED DESCRIPTION

The present disclosure includes downhole tools and devices such as bearings, stabilizers, and other wear surfaces which are subject to abrasive wear in operation (e.g., a kick plate for a rotary steerable system (RSS)). These stabilizers, beatings and downhole devices employ wear-resistant hard materials, which may have various types of microstructures. For example, spherical cast carbide in a Nickel based matrix may be used, and/or sintered HIPed (hot isostatically pressed) tiles may be employed to increase the abrasive wear resistance in either a nickel or copper based matrix. In some instances, the hard phase (the wear tiles) and/or the matrix is reinforced to ensure the bond between the tiles and the matrix does not fail in operation. For example, the tiles may be constructed of a thermally stable silicon-diamond composite material, and/or may be provided with non-planar surfaces to enhance the bond strength with the matrix. The braze alloy or matrix may include encapsulated diamond particles, which may remain hard through the brazing process since the encapsulation protects the diamond from graphitization due to the heat involved in the brazing process. In other instances, the matrix may include various materials that lubricate the bearing or stabilizer when exposed by wear. In still other instances the wear tiles may be constructed of tungsten carbide (WC), and the tungsten carbide may be coated or pre-processed to enhance durability. For instance, pre-leached tungsten carbide may permit the matrix material to enter voids defined in the tungsten carbide, which will improve the bond with the matrix material.

Figure 1:
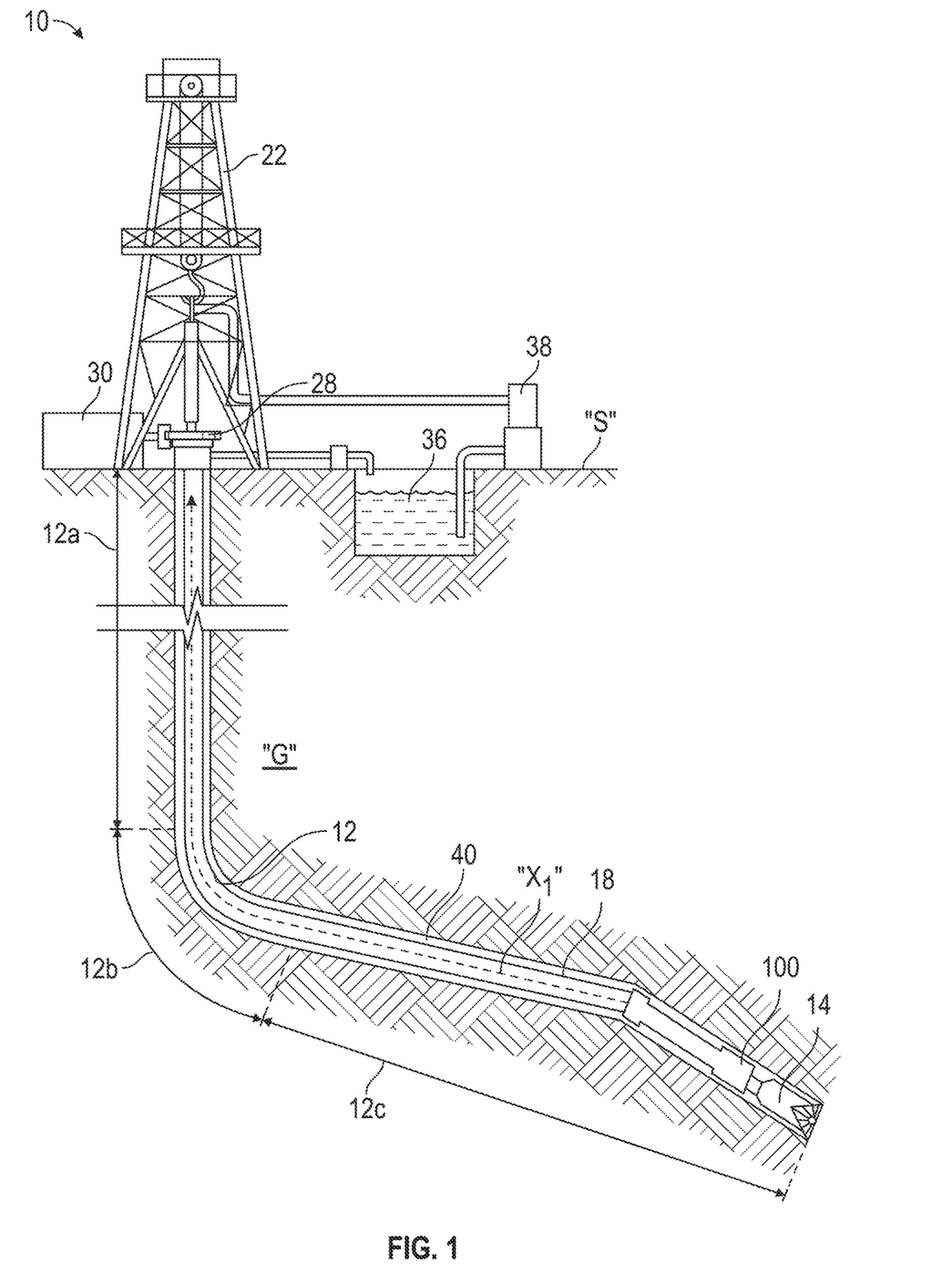
FIG. 1 is a cross-sectional schematic side-view of a wellbore system including a downhole drilling tool or turbodrill coupled at an end of a drill string in accordance with an example embodiment of the disclosure.

FIG. 1 is a cross-sectional schematic side-view of a wellbore system 10 including a downhole tool such as a turbodrill 100. The wellbore system 10 is illustrated as a terrestrial drilling system for creating a wellbore 12 through a geologic formation "G." In other embodiments (not shown) the turbodrill 100 may be employed in other systems such as offshore systems or systems in wellbores having alternate orientations. The turbodrill 100 may operate to receive mudflow and extract energy from the mudflow to turn a drill bit 14 as recognized by those skilled in the art.

The wellbore 12 being drilled by the wellbore system 10 is a directional wellbore 12 in accordance with example embodiments of the disclosure. The wellbore 12 extends from a surface location "S" through a geologic formation "G" along a curved longitudinal axis $X_1$ to define a vertical section 12a, a build section 12b and a tangent section 12c. The tangent section 12c is the deepest section of the wellbore 12, and generally exhibits lower build rates (changes in the inclination of the wellbore 12) than the build section 12b. In other embodiments, the wellbore 12 may be vertical or may be arranged in any other orientation.

Drill bit 14 is a rotary drill bit 14 provided at a down-hole location in the wellbore 12 (illustrated in the tangent section 12c) for cutting into the geologic formation "G." A drill string 18 extends between the drill bit 14 and the surface location "S," and in the illustrated embodiment, the downhole tool 100 is provided within the drill string 18 proximate the drill bit 14. The downhole tool 100 may be a component of a bottom hole assembly (BHA) coupled within the drill string 18, and can be operable to rotate the drill bit 14 with respect to the drill string 18. The term "bottom hole assembly" or "BHA" may be used in this disclosure to describe various components and assemblies disposed proximate to the drill bit 14 at the down-hole end of drill string 18. Examples of components and assemblies (not expressly illustrated in FIG. 1) which may be included in the BHA include, but are not limited to, logging while drilling (lD) equipment, a measure while drilling (MWD) apparatus, a bent sub or housing, a mud motor, a near bit reamer, stabilizers 102, 104 (FIG. 2), and other down hole instruments.

At a surface location "S" a drilling rig 22 is provided to facilitate drilling of the wellbore 12. The drilling rig 22 includes a turntable 28 that rotates the drill string 18 and the drill bit 14 together about the longitudinal axis $X_1$. The turntable 28 is selectively driven by an engine 30, and can be locked to prohibit rotation of the drill string 18. To rotate the drill bit 14 with respect to the drill string 18, mud 36 can be circulated down-hole by mud pump 38. The mud 36 may be pumped through the drill string 18 and passed through the turbodrill 100. Turbine blades (not shown) in the turbodrill 100 may be rotated as the mud 36 passes therethrough. A drive shaft 106 (FIG. 3) operably coupled to the turbine blades and the drill bit 14 will permit the drill bit 14 to rotate along with the turbine blades. The mud 36 can be passed through the bearing assemblies 108 (see, e.g., FIG. 3) within the turbodrill 100 that support the drive shaft 104, and the mud 36 may cool and lubricate the bearing assemblies 108, which also subjects the bearing assemblies 108 to wear.

The mud 36 can be expelled through openings (not shown) in the drill bit 14 to lubricate the drill bit 14, and then returned to the surface location through an annulus 40 defined between the drill string and the geologic formation "G." As the mud 36 returns in the annulus, the mud subjects the stabilizers on the turbodrill to corrosive and abrasive wear. Engagement of the geologic formation "G" also subjects the stabilizers to abrasive wear.

Figure 2:
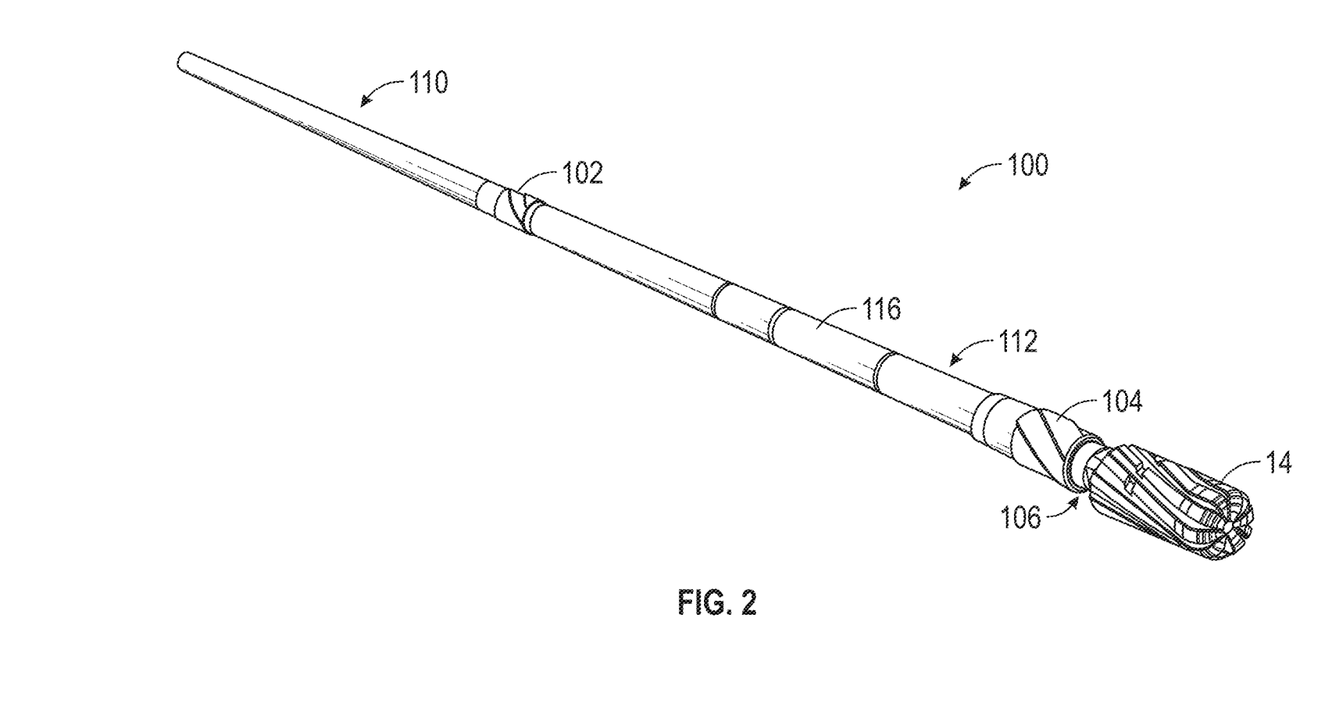
FIG. 2 is a perspective view of the downhole drilling tool of FIG. 1 illustrating a turbine section and a bearing section of the downhole tool.

FIG. 2 is a perspective view of the turbodrill 100 illustrating a turbine section 110 and a hearing section 112 of the turbodrill 100. The turbine section 110 is arranged for coupling to the drill string 18 (FIG. 1) to receive mudflow therefrom. The bearing section 112 is disposed generally between the turbine section 110 and the drill bit 14. As illustrated, an upper stabilizer 102 is generally positioned between the turbine section 110 and the bearing section 112 and a lower stabilizer 104 is positioned generally at the lower end of the bearing section 112 adjacent the drill bit 14.

A drive shaft 106 (FIG. 3) extends through the bearing section 112, which, as illustrated, is generally obscured by a housing component 116. A lower end of the drive shaft 106 is exposed between the lower stabilizer and the drill bit 14. It will be appreciated that in other embodiments, more or fewer stabilizers 102, 104 may be provided, and may be arranged in any configuration along the turbodrill 100.

Figure 3:
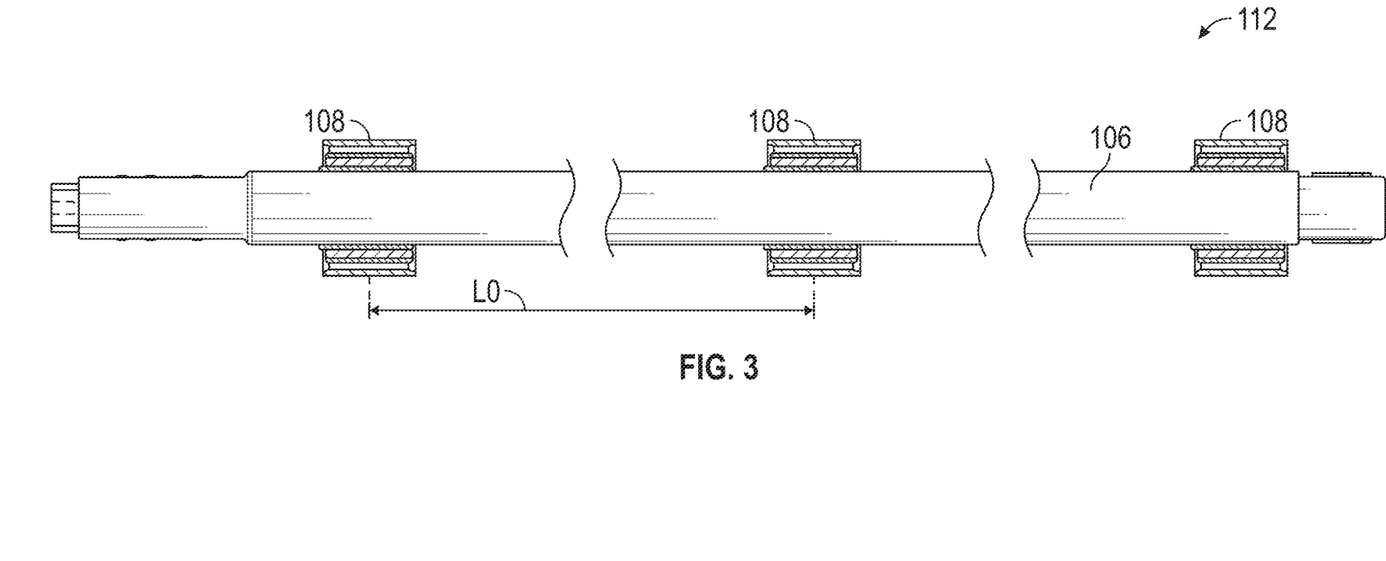
FIG. 3 is a partial side view of the bearing section of FIG. 2 with a housing component removed to illustrate a plurality of bearings assemblies spaced along a drive shaft.

FIG. 3 is a partial side view of the bearing section with the housing component 116 (FIG. 2) removed to illustrate a plurality of bearings assemblies 108 spaced along the drive shaft 106. As illustrated, three bearing assemblies 108 support the drive shaft 106 along its length. The span "L0" between the bearing assemblies may be 4-6 meters in some instances, but may be greater or lower. More or fewer bearing assemblies 108 may also be provided in alternate embodiments (not shown).

Figure 4:
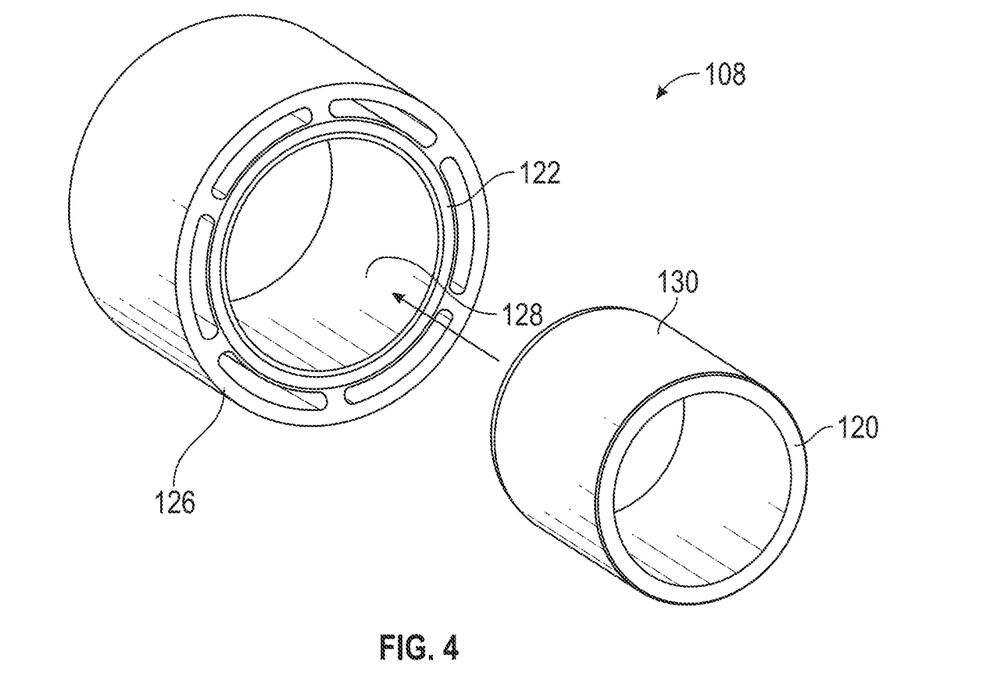
FIG. 4 is a perspective view of one of the bearing assemblies of FIG. 3 illustrating a bearing sleeve separated from a beating bushing.
Figure 5:
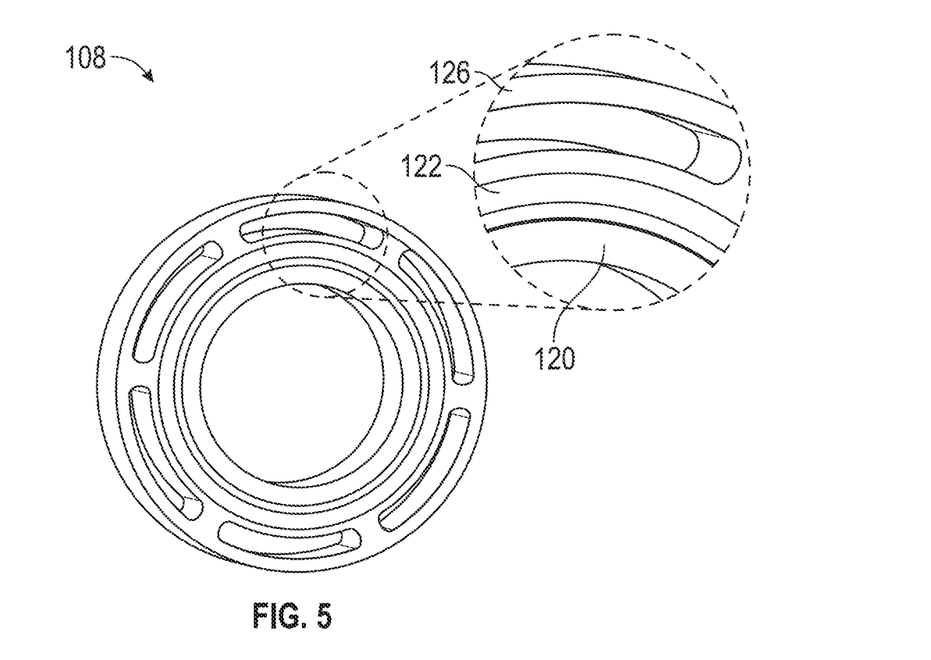
FIG. 5 is a perspective view of the bearing assembly of FIG. 4 illustrating the bearing sleeve assembled with the bearing bushing.

FIGS. 4 and 5 are perspective views of a bearing assembly 108 illustrating a bearing sleeve 120 and a bearing bushing 122 in assembled (FIG. 5) and separated (FIG. 4) configurations. The bearing bushing 122 is the female component that is generally fixed to the housing component 116 (FIG. 2) or tool body. A bearing frame 126 may optionally be provided to facilitate coupling the bearing bushing 122 to the housing component 116 or tool body. An interior bearing surface 128 is provided on the bearing bushing 122 to engage an exterior bearing surface 130 on the hearing sleeve 120. The bearing sleeve 120 is the male component that is generally affixed to the drive shaft 106 (FIG. 3), and rotates within the hearing bushing 122 when assembled.

Figure 6:
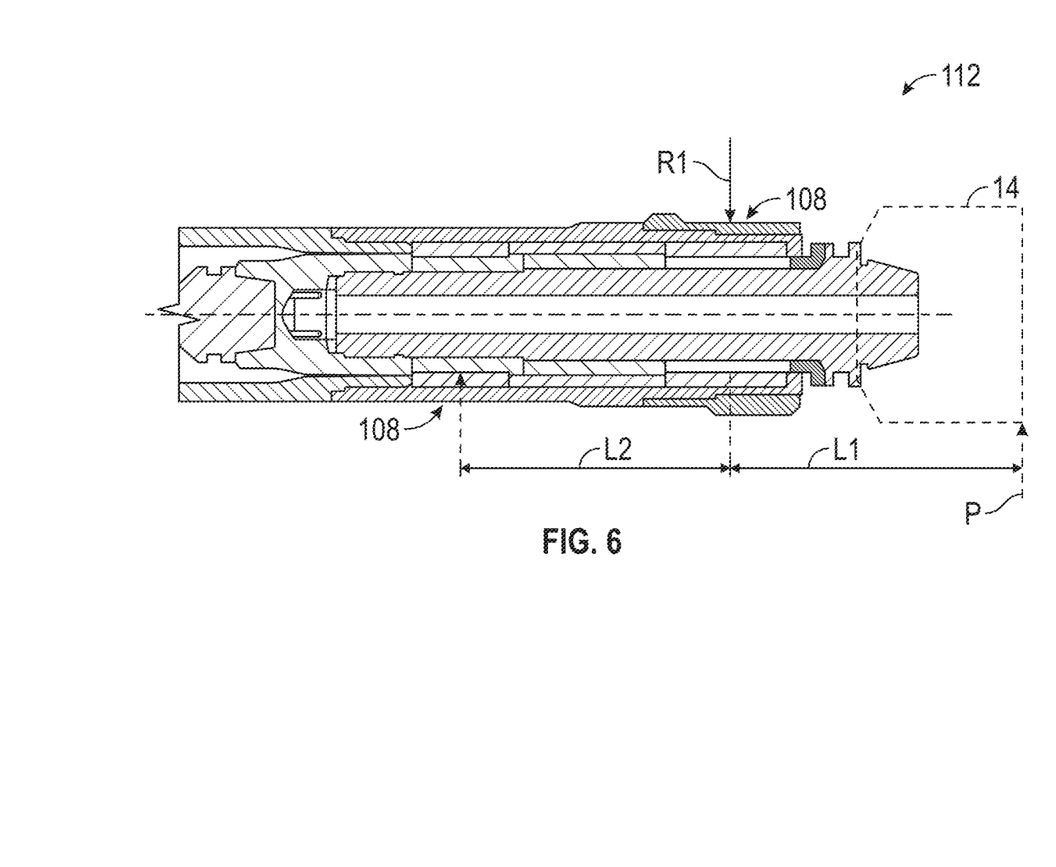
FIG. 6 is a force diagram illustrating an operational loading scenario of the bearing section of FIG. 2.

FIG. 6 is a force diagram illustrating an operational loading scenario of the bearing section 112. The lower-most radial bearing assemblies 108 guide the driveshaft 106 and absorb radial forces P acting on the drill bit 14. These reaction forces R1 are typically much higher than the loads R2 acting on other radial hearing assemblies 108 in the bearing section 112 of the tool. For example, the first reaction force R1 on the lower most bearing assembly 108 is generally related to the bit side force P by the relation:

$$R1=P\times(1+(L1/L2)).$$

A second reaction force R2 on an upper bearing assembly 108 is generally related by:

$$R2=P\times(L1/L2).$$

Thus, the design considerations for the lower bearing assemblies 108, or lower portions of a bearing assembly 108 may be more stringent than the upper bearing assemblies 108 or portions thereof. The use of larger tool bend angles serves to increase the radial loads acting on the drill bit 14 and hence the bearing assemblies 108. Larger tool bend angles generally permit a tighter turn in the build section 12b (FIG. 1).

Figure 7A:
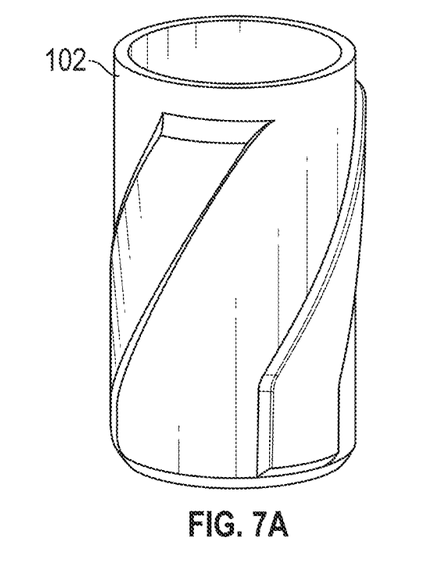
FIG. 7 is a photographic view of a stabilizer and a bearing assembly with enlarged cross-sectional views of the microstructure on respective wear surfaces on each of the stabilizer and bearing assembly.
Figure 7B:
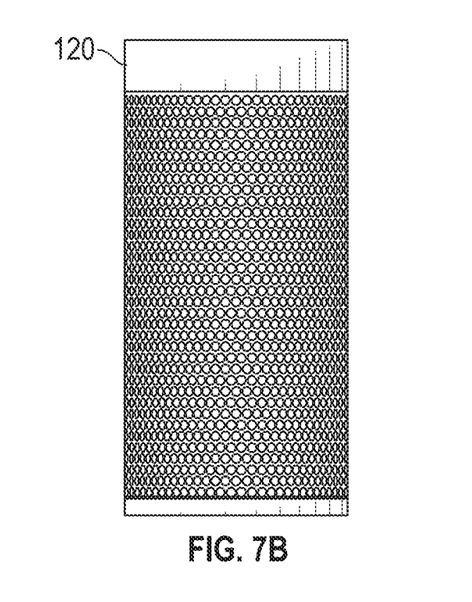
Figure 7C:
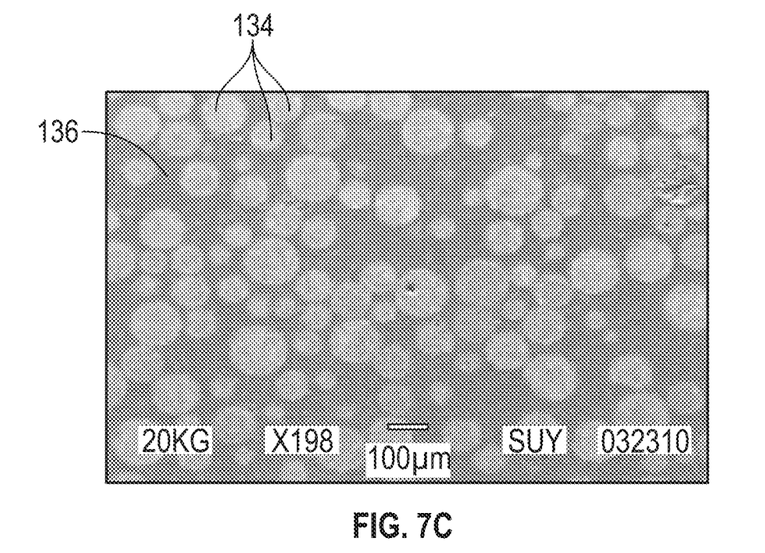
Figure 7D:
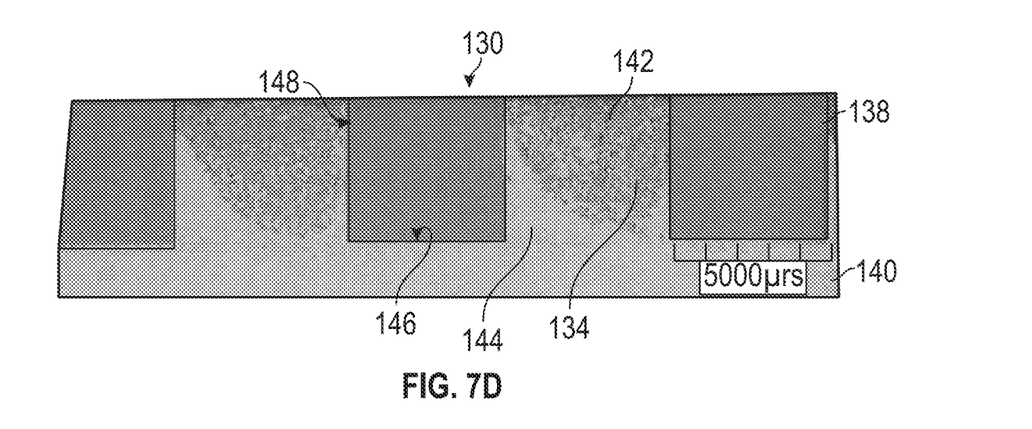

FIGS. 7A and 7B are perspective views of an example stabilizer 102 and an example bearing sleeve 120, and FIGS. 7C and 7D are enlarged cross-sectional views of the microstructure on respective wear surfaces on each of the stabilizer 102 and bearing sleeve 120, The microstructure of the stabilizer wear surface (FIG. 7C) generally includes an abrasion-resistant reinforcement material 134 in a support matrix 136. In some embodiments, the reinforcement material 134 may include a hard phase material such as spherical cast carbide, and the support matrix 136 may include nickel-based matrix materials. Abrasion resistant materials may include any material that is intended to resist material transfer between itself and any other material that is being pushed or pulled across its surface. The microstructure of the wear surface of the bearing sleeve 120 (FIG. 7D), e.g., exterior hearing surface 130 (FIG. 4), generally includes an array of wear tiles 138 secured to a substrate 140 in a filler material 142, e.g., a braze material. In some embodiments, the wear tiles 138 may include sintered HIPed tiles, which may be brazed onto the substrate 140 in a filler material 142 including either a nickel or copper based support matrix 144. The support matrix 144 may be reinforced with spherical cast carbides or other reinforcement materials 134 embedded therein as described below. The HIPed wear tiles 138 may also be found in the stabilizer 102, in some embodiments.

In some embodiments, the HIPed wear tiles 138 are constructed of a base material including a thermally stable polycrystalline (TSP) diamond matrix such as a silicon carbide bonded diamond (SCD) composite. In some embodiments, a suitable SCD material might be a ceramic bonded diamond composite available from various manufacturers of polycrystalline diamond and other superhard materials. In one example, such a composite may be composed of, for example, 80% diamond bonded by a continuous matrix of ceramic silicon carbide. The SCD material is thermally stable even at typical brazing temperatures, and thus, graphitization is less prominent with SCD materials than with PCD (polycrystalline diamond) materials. In some embodiments, a suitable material for the HIPed wear tiles 138 may include diamond spheres interspersed within a silicon carbide matrix. In still other embodiments, wear tiles may be constructed of tungsten carbide or a leached tungsten carbide material.

In some embodiments, materials other than nickel or copper may be employed to create a custom support matrix 136, 144 or braze material. In some embodiments, the support matrix 136, 144 or braze material may include reinforcement materials 134 embedded therein such as spherical cast carbides, or a mixture of other particles as well (such as tungsten disulfide particles as described in greater detail below). The reinforcement material 134 may also include encapsulated diamonds, and/or HIPed or TSP (thermally stable polycrystalline) materials. The sizes of the particles interspersed within the custom support matrix 136, 144 or braze material may be consistent or varied among the particles in the custom support matrix 136, 142 or braze material.

The interface between the braze material and the wear tiles 138 may be arranged to enhance the bond between the wear tiles 138 and the filler material 142. A non-planar surface may be defined on the base 146 and/or sides 148 of the wear tiles 138. The non-planar surface may be machined, chemically etched, or otherwise formed on the wear tiles 138. For example, leached tungsten carbide wear tiles 138 e.g., where a binder is removed from a face that interacts with the braze alloy or other filler material 142, will provide voids within the wear tile 138 into which the braze alloy or other filler material 142 may flow when heated to improve the bond strength between the wear tiles 138 and the braze alloy or braze material 142.

The interface between the filler material 142 and the wear tiles 138 may also be influenced by the distribution of TSP particles or other reinforcement materials 134 in the filler material 142. As illustrated in FIG. 7, the reinforcement materials 134 are arranged in a u-shaped belly profile with the reinforcement materials 134 extending generally across the entire gap between the wear tiles 138 at and near the exposed wear surface 130 and progressively greater spacing between the reinforcement materials 134 and the wear tiles 138 closer to the substrate 140 (at greater depths below the exposed wear surface 130). This arrangement permits the reinforcement materials 134 to provide greater abrasion resistance at the exposed wear surface 130 and permits the filler material 142 to better bind and adhere to the wear tiles 138 beneath the exposed wear surface 130. Other arrangements are also contemplated for providing a non-linear distribution of reinforcement material 134 with higher concentrations at and under the exposed wear surface 130 and lower concentrations adjacent the wear tiles 138. For example, the reinforcement materials 134 may be layered in a bedding arrangement, or a base binder layer generally devoid of reinforcement materials 134 may first be deposited and a then a TSP matrix may be built onto the base binder layer.

Figure 8A:
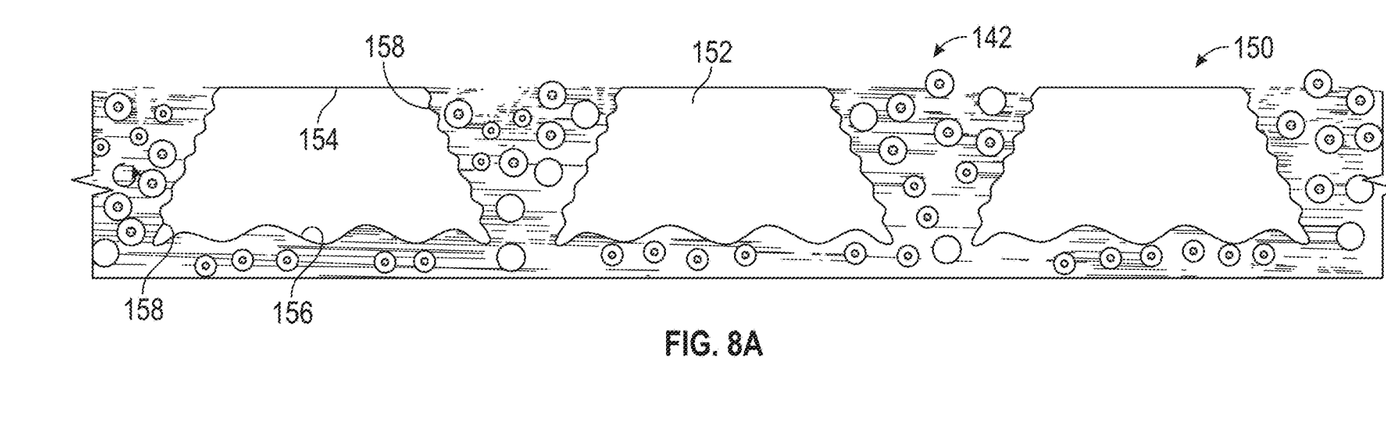
FIGS. 8A and 8B are cross sectional views of alternate arrangements for a wear surface of a bearing assembly, stabilizer or other downhole component, respectively illustrating trapezoidally-shaped and cylindrically-shaped wear tiles.

FIG. 8A is a cross sectional view of an alternate arrangement for a wear surface 150 of a bearing assembly or stabilizer illustrating trapezoidally shaped wear tiles 152. A shorter base 154 of the trapezoid may be exposed above the filler material 142 such that, as the exposed surface wears away, an increasing area fraction of the wear surface 150 is defined by the wear tiles 152, thereby slowing the wear. The shorter exposed base 154 of the trapezoids (or rectangular tiles) may exhibit Multi-modal shapes to improve the packing density and the volume fraction for the exposed wear tiles 152 on the wear surface 150. A longer base 156 and the sides 158 of the trapezoids have undulating or otherwise non-planar surfaces to enhance the bond strength with the filler material 142. The surfaces of the wear tiles 152 that interact with the braze alloy in the filler material 142, e.g., the surfaces defined by the longer base 156 and sides 158, may also be coated with a material that has a better wettability with the braze alloy in the filler material 142 than the SCD or other base material of the wear tiles. The base material of the wear tiles 152 may also be selected for wettability with the braze alloy in the filler material 142. A binderless carbide, e.g., a cemented tungsten carbide grade containing about 0 to about 6 percent binder (e.g., cobalt or nickel alloys) by weight, and in some instances about 0 to about 3 percent by weight, may be employed in some embodiments for the base material of the wear tiles 152. These classes of carbides, including silicon carbide diamond composites, are generally electrically conductive, thus facilitating shaping the wear tiles 152 to the trapezoidal or other shapes by electrical discharge machining (EDM) manufacturing processes.

Also illustrated in FIG. 8A, the filler material 142 may include the support matrix 144 constructed of various combinations of braze alloys or base materials, and may be reinforced with reinforcement material 134, which may include a combination of distinct types of hard particles. The combinations of materials include, but are not limited to any copper based alloys employed, e.g. in fixed cutter drill bits, nickel based alloys (e.g., Ni—Cr—B—Si alloys), which may be used in laser cladding applications, copper based alloys with a bimodal distribution of spherical cast carbide, copper based alloys with a combination of spherical cast carbide and encapsulated diamond powder, copper based alloy with a combination of HIPed carbide spheres plus encapsulated diamond powders and/or cobalt based alloys (e.g., any of a range of cobalt-chromium alloys designed for wear resistance) with HIPed carbide spheres.

In some embodiments, the braze alloy of the support matrix 144 and reinforcement materials 134 may be selected to create a self-lubricating wear surface 150. For example, a braze alloy with a very fine hexagonal Boron Nitride particles may be provided. As the bearing or stabilizer wears, the h-BN will act to reduce the friction coefficient at the exposed wear surface 150. Similarly, a braze alloy with fine Tungsten Disulfide particles continuously dispersed in the matrix may be provided. As the wear surface 150 abrades, the W₂S will act to reduce the friction coefficient at the interface. In some embodiments, a braze alloy may be provided where the h-BN or W₂S particles are encapsulated. When self-lubricated wear surfaces 150 are provided on bearing assemblies 108 (FIG. 3), the bearing assemblies 108 may also be used in non-lubricated systems (as opposed to mud lubricated systems). Also, in many mud-lubricated systems, under very high loading conditions lubrication is compromised causing heat damage (heat checking). This has been a predominant mode of failure in down-hole bearings assemblies 108 under very high loads. Thus, self-lubricated wear surfaces 150 may also be useful in mud lubricated systems to supplement the mud lubrication.

Figure 8B:
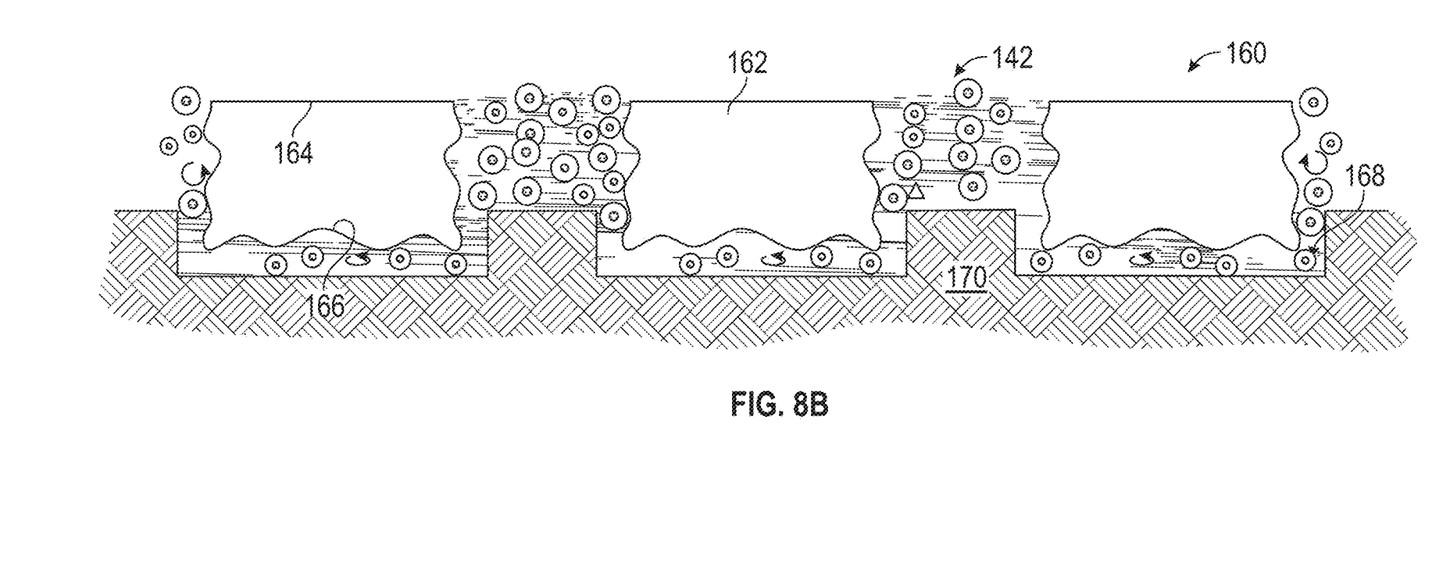

FIG. 8B is a cross-sectional view of an alternate arrangement for a wear surface 160 of a bearing assembly or stabilizer illustrating cylindrically shaped wear tiles 162. An exterior base 164 of the cylinders may be exposed at or above the filler material 142 to define a portion of the wear surface 160. Interior bases 166 of the cylinders may be secured within pockets 168 defined in a substrate 170. The pockets 168 may be machined into the substrate 170 to receive the wear tiles 162 to define a friction fit between the wear tiles 162 and the substrate 170, and/or to permit the filler material 142 to flow between the wear tiles 162 and the substrate 170 within the pockets 168.

Any of the wear tiles discussed herein, including wear tiles 138 (FIG. 7), 152 (FIG. 8) and 162 (FIG. 8B), may be constructed of tungsten carbide (WC) base material. Where the wear tiles are constructed of tungsten carbide, a rectangular WC wear tile 190, 192 (FIGS. 10 and 11) may be provided with non-planar surfaces (e.g., on the sides and an interior base of the rectangle) to enhance the bond at the interface with the brazing material of the filler material 142 as discussed above. A leached WC wear tile 176 (FIG. 9) where the binder is removed from faces that interact with the braze alloys of the filler material 142 may be provided. The braze wettability is much better with a non-binder grade of WC.

Figure 9A:
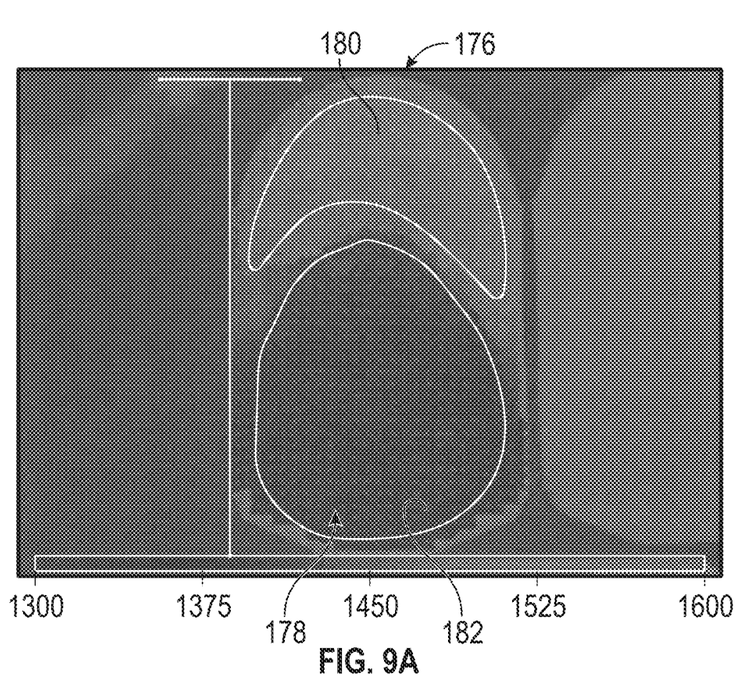
FIG. 9 is a graphical view of the microstructure of a leached tungsten carbide tile illustrating voids defined therein which a matrix material may infiltrate during a brazing process.
Figure 9B:
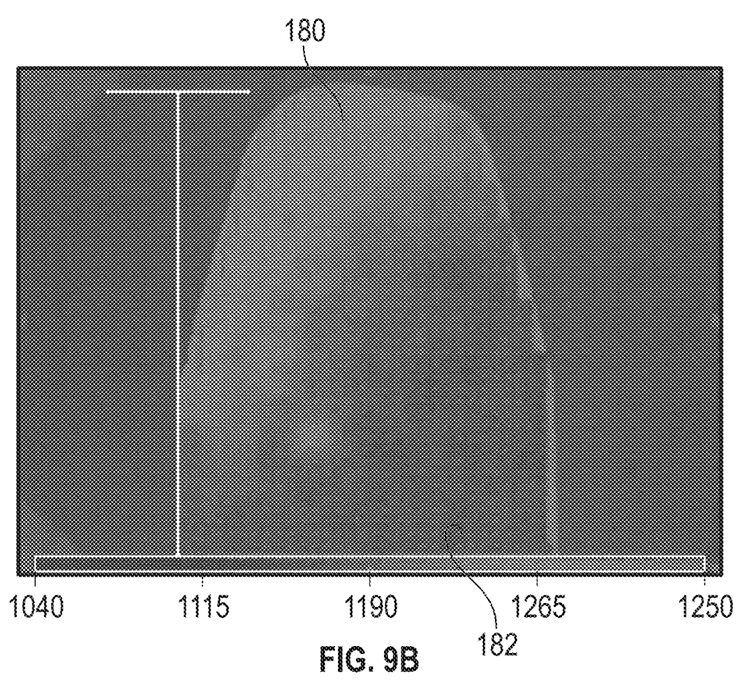

FIG. 9 is a graphical view of the microstructure of a leached tungsten carbide wear tile 176 illustrating a distribution of voids 178 defined therein. A braze alloy of a matrix material or filler material 142 (FIG. 7) may infiltrate the voids 178 during a brazing process to secure the wear tile 176 to a substrate 140 (FIG. 7D). The wear tile 176 may be leached such that a greater number or size of the voids 178 may be provided in an interface region 180 where the wear tile 176 engages the filler material 142, and a smaller number or size of the voids 178 may be provided in a wear region 182 where the wear tile 176 may be exposed to wear in operation.

A functionally graded WC may be provided with the help of leaching of the binder, which facilitates the braze alloys flowing into the voids in the WC material, and increases the surface area of the contact between the WC and braze alloys for improved bonding therebetween. Leached WC wear tiles 176 may be provided with a variety of cross-sectional and exposed surface shapes (rectangular, trapezoidal, square etc.) in some embodiments. A non-planar WC tile (of any shape) with a suitable coating (such as nanostructured tungsten carbide-based coatings having a suitable range of wear and corrosion resistance with toughness and ductility) may be provided to further improve the wettability and hence strength at the braze interface. A suitable braze material (such as a copper based alloy) may be provided to enhance the strength at the braze-hard WC tile interface. Under high load applications, interfacial delamination, fragmentation issues etc. have been observed. These issues may be mitigated by the use of leached WC wear tiles 176 in a bearing assembly 108 (FIG. 3) or stabilizer 102 (FIG. 2). A non-planar interface between the WC wear tiles 176 and the braze alloy could improve the interface area and hence interfacial strength.

The use of thermally stable SiC diamond (SCD), non-planar interface arrangements and application of multimodal shapes of a variety of reinforcement materials may also provide various improvements over conventional bearings and stabilizers. A bearing or stabilizer with low coefficient of friction may be provided with the use of SCD materials, and issues associated with chipping wear of PCD materials (because of the limitation in the way PCD components are manufactured) may be avoided. Enhanced wear resistance may be provided as a result of providing an appropriate packing arrangement. For example, the surface area ratio of braze material to wear tiles may be optimized. An enhanced interfacial strength may also be provided as a result of engineering the interface with non-planar surfaces. Corrosion resistant braze materials may be provided and heat checking resistance as a result of the use of thermally stable hard-phase, e.g., SCD wear tiles.

Figure 10:
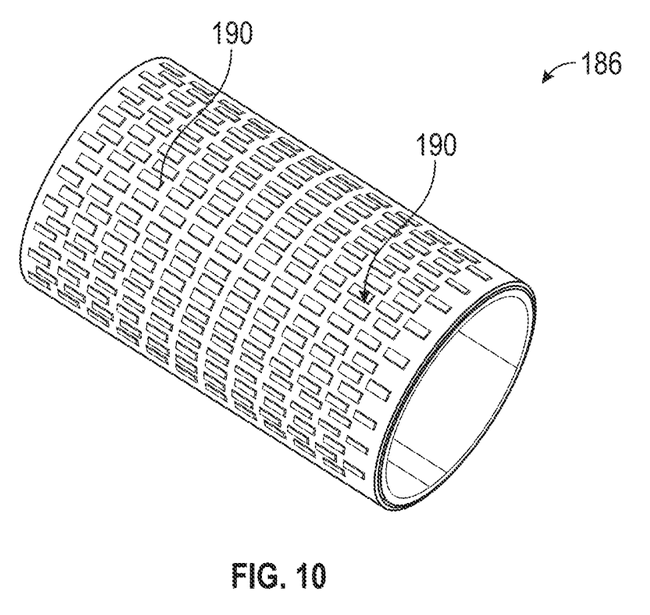
FIGS. 10 and 11 are perspective views of a bearing sleeves illustrating different arrangements and combinations of wear tiles disposed thereon.
Figure 11:
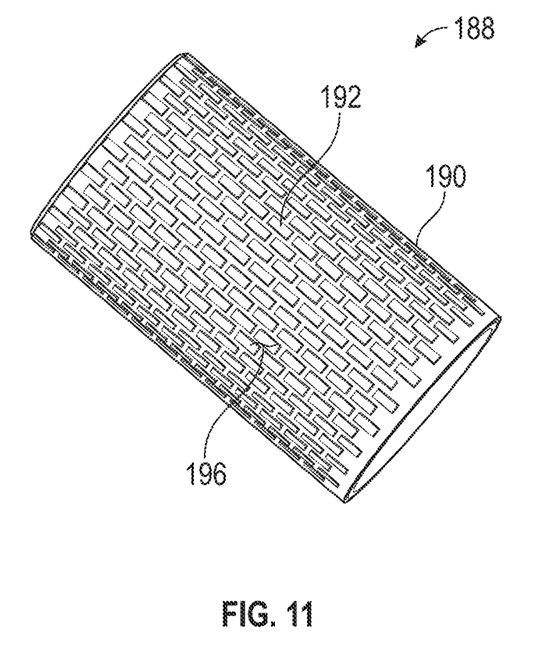

FIGS. 10 and 11 are perspective views of bearing sleeves 186, 188 illustrating different arrangements of wear tiles 190, 192 disposed thereon. The wear tiles 190 may be constructed with a thermally stable poly crystalline diamond (TSP), or in other embodiments, the entire bearing contact surfaces 194 may be constructed of the TSP materials. In still other embodiments, the TSP material may be arranged in any number of patterns or shapes (longitudinal rows, rings around the bearing surfaces, etc.). These materials permit the loads (manufacturing and operational) to be effectively distributed. Also, the use of TSP materials lends itself more readily to accurate grinding or other shaping of the cylindrical components in manufacturing processes. This reduces or eliminates the risk of edge and point contact and hence the resulting mechanical damage that can occur in these situations.

TSP material is extremely hard and hence offers the potential for virtually zero wear as any abrasives that become trapped between the bearing surface in a traditional three body wear situation is simply crushed. However, the material also offers other potential bearing advantages such as low friction, excellent thermal conductivity and high temperature capability (thermal stability). The TSP material may be found in the wear tiles 190 across the entire bearing surface 194 (FIG. 10), or in a subset of the wear tiles 190, 192 across a bearing surface 196 (FIG. 11). For example, wear tiles 190 constructed of TSP inserts may be provided on the lower three rows of the bearing sleeve 188 or other a bearing component, while wear tiles 192 constructed of WC inserts may be provided across the remainder of the bearing surface 196. More or fewer TSP rows may be provided in other embodiments to suit a particular application. Although the male sleeve component 186, 188 is illustrated in FIGS. 10 and 11, it will be appreciated that the female bushing components 122 (FIG. 4) may be similarly arranged. In some embodiments, there may be an overlap or mismatch in the arrangement of TSP wear tiles on the bearing sleeve 186, 188 and bushing components 122. For example, the bearing sleeve component 186, 188 may include three (3) rows of TSP wear tiles 190 while the bushing component 122 may include four (4). By arranging the TSP wear tiles 190 at the lower end, the portions of the bearing assembly exposed to the greatest loads may be effectively protected from wear.

Figure 12:
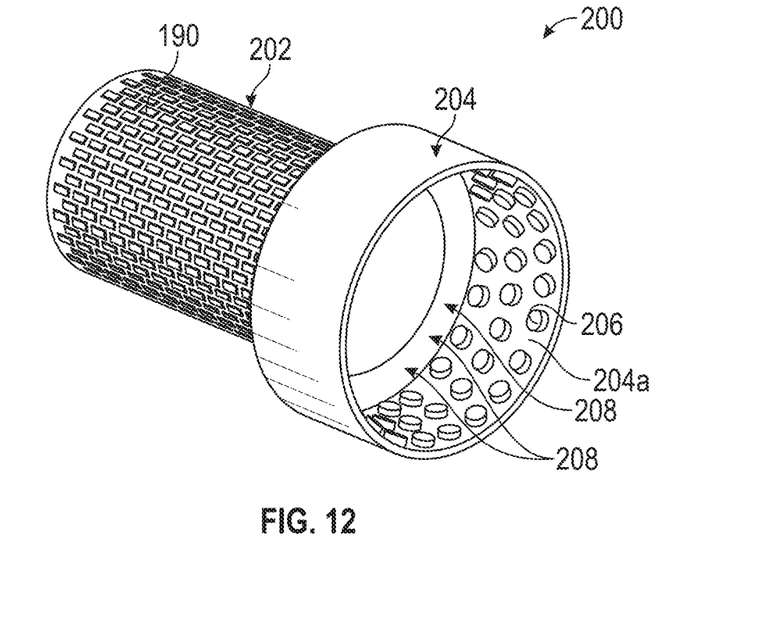
FIG. 12 is a partial, perspective view f bearing sleeve including a first type of wear tiles disposed thereon and a bearing bush partially assembled with the bearing sleeve and including a second type of wear tiles disposed thereon.

FIG. 12 is a partial, perspective view of a partially assembled bearing assembly 200 including a bearing sleeve 202, and a bearing busing 204. The bearing sleeve 202 includes a first type of wear tiles disposed thereon, TSP wear tiles 190, and the bearing bushing 204 includes a second type of wear tiles disposed thereon, e.g., PDC (polycrystalline diamond compact) wear tiles 206. By its very nature TSP is difficult and costly to grind and, whilst external surfaces can be ground economically, internal surfaces are expensive to produce. PDC elements 206 may be provided on the female bushing component 204 of the bearing assembly 200, as the PDC elements 206 can be shaped economically using electrical discharge machining techniques. This combination allows the accurately machined male cylindrical bearing sleeve 202 with TSP wear tiles 190 to run against the discrete but accurately machined PDC elements 206 in the female bushing part 204 of the bearing assembly 200. Also, in the embodiment illustrated, the PDC wear tiles 206 are raised or protrude from an inner surface 204a of the female bushing component 204. This arrangement defines cooling channels 208 between and around the raised PCD inserts 206 and permits the flow of mud 36 (FIG. 1) between the inner surface 204a of the female bushing component 204 and the bearing sleeve 202. The cooling channels 208 provide enhanced flow rates across a length of the bearing assembly for effectively cooling the bearing assembly 200, and permit the bearing assembly 200 to retain a very low friction coefficient. In some embodiments, the PDC elements 206 may be arranged similarly to the wear tiles 152 (FIG. 8A) or wear tiles 162 (FIG. 8B). For example, the PDC elements 206 may be secured to a substrate 170 with a reinforced filler material 142 as described above.

Figure 13:
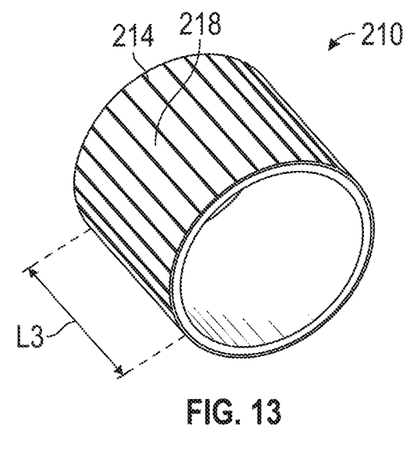
FIGS. 13 and 14 are perspective views of bearing sleeves illustrating channels defined on outer bearing surfaces thereof.
Figure 14:
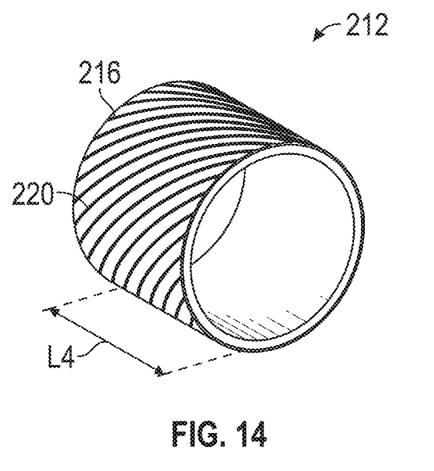

FIGS. 13 and 14 are perspective views of bearing sleeves 210, 212 that include channels 214, 216 extending through the respective lengths L3, L4 of the outer bearing surfaces 218, 220. The channels 214, 216 extend from one longitudinal end of the bearing sleeve 210, 212 to the other, and thus permit the flow of mud 36 (FIG. 1) between the bearing sleeve 210, 212 and the bushing component 122 (FIG. 4) when assembled to facilitate cooling and lubrication. The channels 214, 216 are illustrated as being formed on the outer wear surface 218, 220 of the sleeve 210, 212, but the channels 214, 216 may additionally or alternatively be defined on an interior bearing surface of the bushing component 122 (FIG. 4). The channels 214, 216 may be defined by a filler material 142 (FIG. 8A) or braze material between TSP wear tiles 190 (FIG. 10) that extend the length of the bearing sleeve 210, 212, or alternatively, the channels 214, 216 may be defined directly into a TSP, WC, PCD or other hard surface. As illustrated, in FIG. 13, the channels 214 may all extend generally parallel to a longitudinal axis of the bearing sleeve 210. In other embodiments, as illustrated in FIG. 14, the channels 216 may be obliquely arranged (e.g., curved or slanted) with respect to the longitudinal axis of the bearing sleeve 212. The channels 216 may be defined at any angle to the longitudinal axis, and in some embodiments, the angle may be in the range of about 15 degrees to about 45 degrees.

The aspects of the disclosure described below are provided to describe a selection of concepts in a simplified form that are described in greater detail above. This section is not intended to identify key features or essential features of the claimed subject matter, nor is it intended to be used as an aid in determining the scope of the claimed subject matter.

In one aspect, the disclosure is directed to a stabilizer or radial bearing for a downhole turbine or motor, that includes a thermally stable polycrystalline diamond (TSP) on the wear surface such as the bearing contact surface on the male sleeve component or the female bushing component.

According to another aspect, a radial or composite bearing for downhole tools includes a male sleeve component defining an exterior wear surface thereon and a female bushing component defining interior wear surface thereon. The interior wear surface is for engages the exterior wear surface of the male sleeve component in operation. A plurality of hard phase materials are interspersed within a matrix material on at least one of the exterior wear surface and the interior wear surface. The hard phase materials including at least one of the group consisting of thermally stable polycrystalline diamond (TSP), tungsten carbide (WC), and anti-abrasion materials.

In some example embodiments, the hard phase materials include a silicon carbide bonded diamond composite TSP, a leached PCD or diamond bonded with other types of catalysts with a coefficient of thermal expansion similar to diamond. In some embodiments, the catalysts have a coefficient of thermal expansion within 200% of the coefficient of thermal expansion of diamond. In some embodiments, the catalysts have a coefficient of thermal expansion within the range of about 0.3 micro-inch/in° F. to about 3 micro-inch/in ° F.

In one or more example embodiments, the hard phase materials include a TSP material on the exterior wear surface of the male sleeve component, and the interior wear surface of the female bushing component includes a PDC compact material thereon. A lower portion of the exterior wear surface may include the TSP material and an upper portion of the exterior wear surface may include a WC material. In some embodiments, the hard phase materials include a TSP material on both the exterior wear surface and the interior wear surface.

In some embodiments, the hard phase materials are disposed on wear tiles supported by the matrix material, and wherein the matrix material is a softer braze material. The wear tiles may include a non-planar interface with the softer braze material. The non-planar interface may include a leached surface on the wear the including a distribution of voids defined therein. The distribution of voids may be non-uniform defining an interface region where a relatively large number or size of voids is disposed and a wear region where a relatively small number or size of voids is disposed. In some embodiments, the softer braze material may be reinforced with hard phase particles interspersed therein.

In one or more example embodiments, at least one of the hard phase material and the matrix material is reinforced with lubricating particles. The lubricating particles may include at least one of hexagonal Boron Nitride particles or Tungsten Disulfide particles.

In some embodiments, at least one of the exterior wear surface and the interior wear surface includes a plurality of channels running through a length thereof. The channels may be obliquely arranged with respect to a longitudinal axis of the wear surface.

According to another aspect, the disclosure is directed to a wear surface for a stabilizer, kick plate, composite bearing or radial bearing for a rotary steerable tool, downhole turbine or motor. The wear surface includes a substrate, a plurality of wear tiles constructed of a hard phase material including a TSP material tungsten carbide (WC), and anti-abrasion material, and a filler material interposing the wear tiles and binding the wear tiles to the substrate.

In some example embodiments, the filler material includes a matrix material and a plurality of hard phase particles reinforcing the matrix material. The hard phase particles may include at least one of a spherical cast carbide, an encapsulated diamond particle, and a TSP material. In some embodiments, the hard phase material of the wear tile is coated with a coating having a greater wettability with the filler material than the hard phase material. In some embodiments, the hard phase material of the wear tile may be a WC material, and the coating may be a nanostructured tungsten carbide-based coating. In one or more example embodiments, the substrate may define a plurality of pockets therein, wherein the wear tile may be arranged to protrude from the pockets.

The Abstract of the disclosure is solely for providing the United States Patent and Trademark Office and the public at large with a way by which to determine quickly from a cursory reading the nature and gist of technical disclosure, and it represents solely one or more examples.

While various examples have been illustrated in detail, the disclosure is not limited to the examples shown. Modifications and adaptations of the above examples may occur to those skilled in the art. Such modifications and adaptations are in the scope of the disclosure.

What is claimed is:

1. A bearing for downhole tools, the bearing comprising:
a male sleeve component defining an exterior wear surface thereon;
a female bushing component defining interior wear surface thereon for engaging the exterior wear surface of the male sleeve component in operation; and
a plurality of hard phase materials interspersed within a matrix material on at least one of the exterior wear surface and the interior wear surface, the hard phase materials including at least one of the group consisting of a thermally stable polycrystalline diamond (TSP) material, a tungsten carbide (WC) material, and an anti-abrasion material,
wherein the hard phase materials are disposed on wear tiles supported by the matrix material, and wherein the matrix material is a softer braze material; and
wherein the hard phase materials of the wear tiles are coated with a coating having a greater wettability with the braze material than the hard phase materials.

2. The bearing according to claim 1, wherein the hard phase materials include a silicon carbide bonded diamond composite TSP, a leached PCD or diamond bonded with other types of catalysts with a coefficient of thermal expansion similar to diamond.

3. The bearing according to claim 1, wherein the hard phase materials include the TSP material on the exterior wear surface of the male sleeve component, and wherein the interior wear surface of the female bushing component includes a PDC compact material thereon.

4. The bearing according to claim 3, wherein a lower portion of the exterior wear surface includes the TSP material and wherein an upper portion of the exterior wear surface includes a WC material.

5. The bearing according to claim 1, wherein the hard phase materials include the TSP material on both the exterior wear surface and the interior wear surface.

6. The bearing according to claim 1, wherein the wear tiles include a non-planar interface with the softer braze material.

7. The bearing according to claim 6, wherein the non-planar interface includes a leached surface on the wear tile including a distribution of voids defined therein.

8. The bearing according to claim 7, wherein the distribution of voids is non-uniform defining an interface region where relatively large voids are disposed and a wear region where relatively small voids are disposed.

9. The bearing according to claim 1, wherein the softer braze material is reinforced with hard phase particles interspersed therein.

10. The bearing according to claim 1, wherein at least one of the hard phase material and the matrix material is reinforced with lubricating particles.

11. The bearing according to claim 10, wherein the lubricating particles are at least one of hexagonal Boron Nitride particles or Tungsten Disulfide particles.

12. The bearing according to claim 1, wherein at least one of the exterior wear surface and the interior wear surface includes a plurality of channels running through a length thereof.

13. The bearing according to claim 12, wherein the channels are obliquely arranged with respect to a longitudinal axis of the wear surface.

14. A wear surface for a stabilizer, kick plate, composite bearing or radial bearing for a rotary steerable tool, downhole turbine or motor, the wear surface comprising:
a substrate;
a plurality of wear tiles constructed of a hard phase material including a TSP material tungsten carbide (WC), and anti-abrasion material; and
a filler material interposing the wear tiles and binding the wear tiles to the substrate, wherein the hard phase material of the wear tile is coated with a coating having a greater wettability with the filler material than the hard phase material.

15. The wear surface according to claim 14, wherein the filler material includes a matrix material and a plurality of hard phase particles reinforcing the matrix material.

16. The wear surface according to claim 15, wherein the hard phase particles include at least one of a spherical cast carbide, an encapsulated diamond particle, and the TSP material.

17. The wear surface according to claim 14, wherein the hard phase material of the wear tile is a WC material, and wherein the coating is a nanostructured tungsten carbide-based coating.

18. The wear surface according to claim 14, wherein the substrate defines a plurality of pockets therein, and wherein the wear tiles are arranged to protrude from the pockets.

* * * * *

UNITED STATES PATENT AND TRADEMARK OFFICE
CERTIFICATE OF CORRECTION

PATENT NO. : 10,718,374 B2
APPLICATION NO. : 16/314360
DATED : July 21, 2020
INVENTOR(S) : Krutibas Panda et al.

It is certified that error appears in the above-identified patent and that said Letters Patent is hereby corrected as shown below:

In the Specification

Column 1, Line 24, change "dulling" to -- drilling --

Column 1, Line 64, change "beating" to -- bearing --

Column 2, Line 19, change "f" to -- of --

Column 2, Line 33, change "beatings" to -- bearings --

Column 3, Line 27, change "(MD)" to -- (LWD) --

Column 3, Line 59, change "hearing" to -- bearing --

Column 4, Line 26, change "hearing" to -- bearing --

Column 4, Line 29, change "hearing" to -- bearing --

Column 4, Line 35, change "hearing" to -- bearing --

Column 4, Line 67, change "hearing" to -- bearing --

Column 10, Line 40, change "wear the" to -- wear tile --

Signed and Sealed this
Twenty-seventh Day of October, 2020

Andrei Iancu
*Director of the United States Patent and Trademark Office*